US012571661B2

(12) United States Patent
Fisher

(10) Patent No.: US 12,571,661 B2
(45) Date of Patent: Mar. 10, 2026

(54) POSITION ENCODER APPARATUS WITH SENSOR HAVING INDIVIDUALLY ACTIVATABLE ROWS

(71) Applicant: RENISHAW PLC, Wotton-under-Edge (GB)

(72) Inventor: Harrison Clinton Fisher, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 18/291,642

(22) PCT Filed: Aug. 9, 2022

(86) PCT No.: PCT/GB2022/052072
§ 371 (c)(1),
(2) Date: Jan. 24, 2024

(87) PCT Pub. No.: WO2023/017254
PCT Pub. Date: Feb. 16, 2023

(65) Prior Publication Data
US 2024/0369385 A1 Nov. 7, 2024

(30) Foreign Application Priority Data
Aug. 12, 2021 (EP) ..................................... 21275112

(51) Int. Cl.
*G01D 5/347* (2006.01)
(52) U.S. Cl.
CPC ....... *G01D 5/34715* (2013.01); *G01D 5/3473* (2013.01)

(58) Field of Classification Search
CPC ............. G01D 5/34715; G01D 5/3473; G01D 5/34746
See application file for complete search history.

(56) References Cited

U.S. PATENT DOCUMENTS

| | | | |
|---|---|---|---|
| 5,279,044 A | 1/1994 | Bremer | |
| 5,861,953 A | 1/1999 | Henshaw | |
| (Continued) | | | |

FOREIGN PATENT DOCUMENTS

| | | | |
|---|---|---|---|
| EP | 0 503 716 A1 | 9/1992 | |
| EP | 1562371 A1 | 8/2005 | |
| (Continued) | | | |

OTHER PUBLICATIONS

Nov. 11, 2022 Search Report issued in International Patent Application No. PCT/GB2022/052072.
(Continued)

*Primary Examiner* — Jennifer D Bennett
(74) *Attorney, Agent, or Firm* — Oliff PLC

(57) ABSTRACT
A position measurement encoder including a scale and a readhead, the readhead including a sensor for sensing the scale, the sensor including a one-dimensional array of columnar pixels, configured such that the one-dimensional array of columnar pixels is divided into a plurality of rows wherein each columnar pixel has at least one individual sensing section in each row arranged to contribute to the columnar pixel's output. Each row is individually activatable so that which one or more of the individual sensing sections in the columnar pixels contribute to each columnar pixel's output can be selectively chosen and changed on a row-by-row basis.

29 Claims, 8 Drawing Sheets

(56)                References Cited

U.S. PATENT DOCUMENTS

| | | | |
|---|---|---|---|
| 6,188,058 B1* | 2/2001 | Tullis | G01D 5/347 |
| | | | 250/559.38 |
| 7,087,883 B2 | 8/2006 | He et al. | |
| 7,193,197 B2 | 3/2007 | Sugiyama et al. | |
| 7,402,789 B2 | 7/2008 | Bock | |
| 7,499,827 B2 | 3/2009 | Gordon-Ingram | |
| 7,589,313 B2 | 9/2009 | Nordenfelt et al. | |
| 7,659,992 B2 | 2/2010 | McMurtry et al. | |
| 7,748,251 B2 | 7/2010 | Bernhard | |
| 8,169,619 B2 | 5/2012 | Oberhauser | |
| 8,742,956 B2 | 6/2014 | Gordon-Ingram et al. | |
| 9,103,381 B2 | 8/2015 | Arnstein | |
| 10,132,657 B2 | 11/2018 | Gordon-Ingram et al. | |
| 10,670,431 B2 | 6/2020 | Slack et al. | |
| 10,989,567 B2 | 4/2021 | Gribble | |
| 2004/0118758 A1 | 6/2004 | Gordon-Ingram | |
| 2005/0185077 A1 | 8/2005 | Xiao | |
| 2006/0175536 A1 | 8/2006 | Kim et al. | |
| 2008/0013105 A1 | 1/2008 | McMurtry et al. | |
| 2010/0245839 A1 | 9/2010 | Oberhauser | |
| 2012/0007980 A1 | 1/2012 | Gordon-Ingram et al. | |
| 2012/0072169 A1 | 3/2012 | Gribble | |
| 2014/0299754 A1* | 10/2014 | Okada | G01D 5/24476 |
| | | | 250/231.1 |
| 2015/0108353 A1* | 4/2015 | Geiger | G01D 5/34707 |
| | | | 250/341.8 |
| 2015/0123174 A1* | 5/2015 | Mayer | H01L 29/765 |
| | | | 257/231 |
| 2018/0216972 A1 | 8/2018 | Slack et al. | |
| 2018/0217510 A1 | 8/2018 | Wells et al. | |
| 2019/0178687 A1 | 6/2019 | Horiguchi | |
| 2020/0072644 A1* | 3/2020 | Masa | G01D 5/34776 |
| 2020/0106980 A1 | 4/2020 | Millet | |
| 2020/0141766 A1 | 5/2020 | Cusey et al. | |
| 2021/0044771 A1 | 2/2021 | Kwag | |
| 2021/0278254 A1 | 9/2021 | Gribble | |

FOREIGN PATENT DOCUMENTS

| | | | |
|---|---|---|---|
| EP | 2660610 | A2 | 11/2013 |
| KR | 10-0790582 | B1 | 1/2008 |
| WO | 2002/084223 | A1 | 10/2002 |
| WO | 2004/094957 | A1 | 11/2004 |
| WO | 2010/116144 | A2 | 10/2010 |
| WO | 2010/116145 | A2 | 10/2010 |
| WO | 2010/128279 | A2 | 11/2010 |
| WO | 2017/042570 | A1 | 3/2017 |
| WO | 2021/094456 | A1 | 5/2021 |

OTHER PUBLICATIONS

Nov. 11, 2022 Written Opinion of the ISA issued in International Patent Application No. PCT/GB2022/052072.
Jan. 31, 2022 Search Report issued in European Patent Application No. 21275112.7.
Jan. 9, 2023 Search Report issued in European Patent Application No. 22275108.3.

* cited by examiner

206

Rows
A-B

Rows
C-F

Rows
G-H y z    x

206

Rows
A-D

Rows
E-H y z    x (a)                                        (b)

POSITION ENCODER APPARATUS WITH SENSOR HAVING INDIVIDUALLY ACTIVATABLE ROWS

This invention relates to a position measurement encoder apparatus.

A position measurement encoder apparatus, hereinafter referred to as an "encoder apparatus" or "position encoder", can be used to determine movement between two relatively moveable parts of an apparatus. A position encoder typically comprises a scale and a readhead, one provided on one part of the apparatus and the other on the other part of the apparatus. The scale can comprise a series of features which the readhead can read so as to measure its position (and/or its derivatives such as velocity and/or acceleration) along the measuring direction of the scale. The scale's features, for example, could be provided on a substrate which is fastened to the part of the apparatus, or could even be formed integrally as part of the apparatus.

A so-called "incremental" position encoder can work, for example, by "counting" its position along the length of the scale, e.g. from its start-up position and/or from a defined reference marker(s) on the scale. As will be understood, the way in which the "counting" of the readhead's position is done can vary from encoder apparatus to encoder apparatus. One way is to generate a resultant field, such as a fringe field, modulated spots or image, at a detector in the readhead which changes with relative movement. For example, light from a source (e.g. within the readhead) can hit the scale which diffracts the light into a number of diffraction orders. Optionally, an optical element (for example a diffraction grating and/or lens) within the readhead can be configured to cause diffraction orders from the scale to be recombined at the detector so as to produce the resultant field. As the scale and readhead move relative to each other, the resultant field changes. The readhead can record and/or report movement and position by monitoring the change of the resultant field (e.g. movement of the fringe field). Such a position encoder is described in U.S. Pat. No. 5,861,953. As will be understood, reference marks can be provided, for instance next to and/or embedded within the scale's diffraction features, in order to provide defined reference positions. Such a position encoder is described in U.S. Pat. No. 7,659,992.

So-called "absolute" position encoders are also known which enable the absolute position of the readhead relative to a scale to be determined without the need to count from a predetermined position, such as a reference mark or an end position of the scale. Absolute position encoders typically comprise a scale with unique position data formed on it along the measuring length of the scale. The data can be in the form of, for instance, a pseudorandom sequence or discrete codewords. By reading this data as the scale reader passes over the scale the scale reader can determine its absolute position. Examples of absolute position encoders are described in U.S. Pat. Nos. 7,499,827, 10,132,657 and US2012/0072169. It is known to use incremental scales alongside absolute scales. It is also known (and for example described in U.S. Pat. No. 7,499,827) that the absolute scale retains sufficient periodicity such that the scale can be used as a periodic incremental scale. Either way, such incremental scale can be used, for example, to fine-tune the determined absolute position. For example, after the absolute position has been determined at start-up, the relative position of the readhead and scale can subsequently be measured by "counting" the change in position using the incremental scale. Such an incremental scale can be read in the same way as mentioned above, e.g. by analysing a resultant field produced (at a sensor in the readhead) by the recombination of diffraction orders created by the scale.

It is known to provide a sensor for reading the scale, comprising a one-dimensional array of elongate pixels, such as those shown and described in connection with U.S. Pat. Nos. 7,659,992, 10,670,431 and WO2010/128279. Elongate pixels are particularly useful when detecting elongate one-dimensional scale features because increasing their length increases system photometry. Compared to the pixels and photodiodes used in general purpose camera sensors, sensors used in readheads for reading scale are known to have pixels comprising unusually long photodiodes. For instance, the pixels of the one-dimensional sensor of the RESOLUTE readhead available from Renishaw plc each comprise one photodiode which is approximately 1 mm long and 7 μm wide (a ratio of approximately 143:1); wherein the length of pixel is measured perpendicular to the measuring direction of the scale/readhead. In order to improve charge read-off times, rather than tapping off the charge of the photodiode via one readout line, the sensor used in the RESOLUTE readhead is configured to tap off the charge of each photodiode at a number of different points along its length, via a number of tap-off points connected to the photodiode along its length (in particular via 8 tap-off points) so as to reduce the distance between light sensitive points on the photodiode to a readout line. It is also known from the RESOLUTE readhead to provide more pixels than is needed. For instance, the RESOLUTE comprises 320 pixels, but only 256 are actually needed and used to obtain an image of the scale (for instance, as described in WO2010/128279).

The present invention relates to improvements in the sensor used in a readhead for reading scale.

According to a first aspect of the invention there is provided a position measurement encoder comprising a scale and a readhead, the readhead comprising a sensor for sensing the scale, the sensor comprising a one-dimensional array of columnar pixels, configured such that the sensor/one-dimensional array of columnar pixels is divided into a plurality of rows, wherein each columnar pixel has at least one individual sensing section in each row arranged to contribute to the columnar pixel's output. Preferably, each row of individual sensing sections (of the sensor/one-dimensional array of columnar pixels) is individually activatable so that which one or more of (in other words, "which one or plurality of") the individual sensing sections in the columnar pixels contribute to each columnar pixel's output can be selectively chosen and changed on a row-by-row basis. In other words, preferably all individual sensing sections in the same row are collectively activatable, on a row-by-row basis. Accordingly, in other words, each row could be individually activatable so that the subset of the rows of individual sensing sections which contribute to each columnar pixel's output can be selectively chosen and changed (wherein, as will be understood, a subset can include one, some or even all of the rows, c.f. a proper subset which cannot include all of the rows).

It has been found beneficial to provide a sensor with an array of columnar pixels which are divided into rows of individual (i.e. separate) sensing sections. For example, as explained in more detail below, such a configuration can provide greater flexibility in choosing which regions (i.e. which row or rows) of the array of columnar pixels contribute to a reading of the scale, and/or it can provide for faster sensor readout. Such a configuration can be used to provide many different benefits, including, but not limited to, improved ease of manufacture and/or installation, and/or improved encoder performance such as reduced position error.

Suitable scale signals which can be sensed by the sensor include magnetic, optical, capacitive, or inductive scale signals. As will be understood, in the case of an optical position measurement encoder, the readhead can comprise a light source which is configured to illuminate the scale. The optical position measurement encoder could be a reflective optical position measurement encoder (in which case the light source and the sensor are on the same side of the scale) or a transmissive optical position measurement encoder (in which case the light source and the sensor are on opposite sides of the scale). As will be understood, references herein to "light" and "optical" encompasses electromagnetic radiation (EMR) anywhere in the infra-red to the ultra-violet range. For example, the light source could be an infra-red light source.

Optionally, the scale signal comprises/could be referred to as a resultant field. The resultant field could comprise a fringe (e.g. fringe field). The fringe could comprise an interference fringe. Accordingly, the scale could comprise a series of features configured to diffract light. Optionally, the readhead comprises one or more diffraction gratings for producing said interference fringe. For example, the one or more diffraction gratings can interact with light heading towards/from the scale so as to produce said interference fringe. Optionally, said interference fringe is produced by the recombination of diffracted orders of light from the scale and diffraction grating (and optionally in that order).

The sensor could be arranged at the conjugate plane of the scale (for example, such that an image of the scale is formed on the sensor). Accordingly, for example, optionally, the scale signal/resultant field comprises an image of the scale. Accordingly, the readhead can be configured to image the scale onto the sensor. Optionally, the readhead comprises one or more optical elements (e.g. one or more lenses) configured to form an image of the scale on the sensor. Suitable optical elements include refractive (e.g. cylindrical/spherical/Fresnel lenses) or diffractive (e.g. Fresnel Zone Plate) optical elements. Optionally, the sensor is configured to capture said image. As will be understood, the one-dimensional array of pixels will capture a one-dimensional image. Optionally, said one or more optical elements could be configured to form only a one-dimensional image onto the sensor. However, this need not be the case and said one or more optical elements could be configured to form a two-dimensional image onto the sensor. Indeed, it can be preferable for said one or more optical elements to form a two-dimensional image onto the sensor.

The position measurement encoder could comprise an incremental position measurement encoder. Accordingly, the scale could comprise an incremental scale. The scale could comprise at least one track comprising a series of (generally) periodically arranged features. As will be understood, one or more reference features, next to or embedded within said at least one track could be provided.

The position measurement encoder can be an absolute position measurement encoder. Accordingly, the scale can comprise an absolute scale. In other words, the scale can comprise features defining absolute position information. The scale can comprise features defining a series of unique absolute positions. The features defining the absolute position information could be contained in at least one track. In addition to features defining absolute position information the scale can comprise features defining incremental position. The features defining the incremental position information can be the same features as those defining absolute position (e.g. absolute position information can be embedded within incremental position features, such as for example described in U.S. Pat. No. 7,499,827). Optionally, the scale comprises a separate track comprising a series of generally periodically arranged features which can be used to determine incremental position information.

Either way (whether absolute or incremental), as mentioned above in the background section of this document, the signal sensed by the sensor can be used to measure the position (or a derivative thereof) of the readhead along the measuring direction of the scale.

Preferably, the scale is a one-dimensional scale.

As will be understood, there are various ways in which the columnar pixels' output can be read/accessed. For instance, the sensor could be configured such that during use/operation, a columnar pixel's output is continuously streamed to a downstream device/component (e.g. processing device/component which, for example, uses/processes/converts the output). Additionally/alternatively, the encoder/sensor could be configured such that multiple columnar pixels' outputs are combined. For instance, the sensor could comprise an electrograting which is a sensor comprising two or more sets of interdigitated/interleaved pixels, each set being configured to detect a different phase of the signal falling on the sensor. In this case, the outputs of the pixels in the same set can be combined such that their outputs are provided as one output signal to a downstream device/component (e.g. processing device/component).

As will be understood, references herein to "processing device"/"processor"/"component for processing", and the like, are intended to include bespoke processing devices configured for the specific application (e.g. a field programmable gate array "FPGA") as well as a more generic processing devices which can be programmed (e.g. via software) in accordance with the needs of the application in which it is used. Accordingly, suitable processing devices include, for example, a CPU (Central Processor Unit), FPGA (Field Programmable Gate Array), or ASIC (Application Specific Integrated Circuit), or the like.

Preferably, each columnar pixel has a (e.g. has an associated) shared/common/single signal storage region, for storing signal from multiple (e.g. all of the) individual sensing sections in the columnar pixel. The signal storage region could be referred to as an accumulated signal storage region. The signal storage region could be a charge storage region. Accordingly, each columnar pixel could comprise a shared/common/single charge storage region for storing/ "accumulating" charge from multiple (e.g. all of the) individual sensing sections in the columnar pixel. The sensor can be configured such that each of the at least one individual sensing sections in each row is able to contribute to a (e.g. "accumulated") signal (e.g. charge) stored at the columnar pixels' signal (e.g. charge) storage region. Preferably, the sensor can be configured such that each signal (e.g. charge) storage region can be selectively addressed and read. As will be understood, this includes a configuration in which the columnar pixels' storage regions are configured to be read out in turn (e.g. sequentially) automatically.

In the case in which the columnar pixels comprise a signal (e.g. charge) storage region, preferably each row (of individual/separate sensing sections) is individually activatable so that which one or more of the individual sensing sections in the columnar pixels contribute to the signal (e.g. charge) stored at each columnar pixel's signal (e.g. charge) storage region can be selectively chosen and changed on a row-by-row basis. This could be achieved, for example, by each individual sensing section comprising its own switch/gate, e.g. transmission/transfer gate. Accordingly, the switch/gate can be used to control which of the individual sensing sections in a columnar pixel transfers/reads out its signal to the columnar pixel's signal storage region. As per the above, the sensor can be configured such that the switches/gates for individual sensing sections in the same row are collectively activatable, on a row-by-row basis.

Preferably, the individual sensing sections in a columnar pixel can be read (can transfer their signal) simultaneously. For example, where present, the individual sensing sections in a columnar pixel can transfer their signal to the columnar pixel's signal storage region simultaneously. For instance, they could be arranged/connected in parallel to the columnar pixel's signal storage region. Each individual sensing section could comprise its own switch/gate, e.g. transmission/ transfer gate. Accordingly, the switch/gate can be used to control which of the individual sensing sections in a columnar pixel transfers/reads out its signal to the columnar pixel's signal storage region. As per the preceding paragraph, the switches/gates for individual sensing sections in the same row can be connected such that they are collectively activatable, on a row-by-row basis.

As will be understood, a columnar pixel will be elongate in configuration. The invention can be particularly useful for sensors where the ratio of the pixels' light sensitive length to its light sensitive width is at least 10:1, for example, at least 50:1, for instance at least 100:1.

Optionally, the sensor is divided into at least four rows, optionally at least six rows, for example at least eight rows.

Optionally, the sensor comprises at least 50 columnar pixels, for example at least 100 columnar pixels, in particular at least 256 columnar pixels, for instance at least 500 columnar pixels.

Optionally, the sensor is configured such that the ratio of columnar pixels to the number of rows is not less than 10:1 (i.e. such that there is at least 10 times as many columnar pixels are there are rows).

An individual sensing section can comprise a photodetector (e.g. photodiode). Preferably, all the individual photodetector in a columnar pixel are configured to detect the same wavelength range.

Optionally, a columnar pixel has only a single individual sensing section (e.g. photodetector) in each row which is arranged to contribute to the columnar pixel's output (e.g. contribute to an accumulated charge stored at the columnar pixel's charge storage region).

According to another aspect of the invention there is provided a method of operating a position measurement encoder as described above, comprising: obtaining a reading of the scale by, for each of a plurality of the columnar pixels, reading the output (e.g. the charge accumulated at the charge storage region of the columnar pixel which was) generated by the individual sensing sections in a first proper subset of the rows.

The method could further comprise obtaining another reading of the scale by, for each of a plurality of the columnar pixels, reading the output (e.g. the charge accumulated at the charge storage region of the columnar pixel which was) generated by the individual sensing sections in a second proper subset of the rows, different to the first proper subset. As will be understood, the method could comprise obtaining further readings of the scale by reading the output (e.g. the charge accumulated at the charge storage region of the columnar pixel which was) generated by the individual sensing sections in further/other proper subsets of the rows (e.g. third, fourth or more proper subsets of the rows). Optionally, although not necessarily, there can be overlapping rows in the proper subsets (e.g. the first and second proper subsets could comprise at least one row in common).

The method can comprise processing, e.g. comparing, the readings obtained from the first and second proper subsets to determine at least one property of the position measurement encoder. The at least one property could comprise at least one of: radius of the scale; relative configuration of the readhead and scale; quality of the scale reading.

The rows to be included in the first proper subset of the rows for a subsequent reading could be selected (e.g. automatically) based on a parameter determined from at least one previous reading of the scale. As will be understood, this need not necessarily be the case. For example, the rows to be included in the first proper subset of the rows for a subsequent reading could selected based on the type of the scale being used (e.g. if it is known that the readhead is to be used on a small face-read disc, then the readhead could be configured to only use a middle set of rows).

The method can comprise operating the readhead to: cause the sensor to repeatedly obtain readings of the scale; concurrently monitor at least some of the readings; and based thereon, automatically adapt which subset of rows are used to contribute to the columnar pixels' output (e.g. accumulate charge at charge storage regions) for one or more subsequent readings of the scale.

According to another aspect of the invention there is provided a sensor comprising a one-dimensional array of columnar pixels, configured such that the sensor/one-dimensional array of columnar pixels is divided into a plurality of rows, wherein each columnar pixel has at least one individual sensing section in each row arranged to contribute to the columnar pixel's output. Preferably, each row of individual sensing sections (of the sensor/one-dimensional array of columnar pixels) is individually activatable so that which one or more of the individual sensing sections in the columnar pixels contribute to each columnar pixel's output can be selectively chosen and changed on a row-by-row basis. In other words, preferably all individual sensing sections in the same row are collectively activatable, on a row-by-row basis. As will be understood, features described above in connection with the other aspect of the invention as also applicable to this aspect.

Embodiments of the invention will now be described, by way of example only, with reference to the following drawings, in which.

Figure 12:
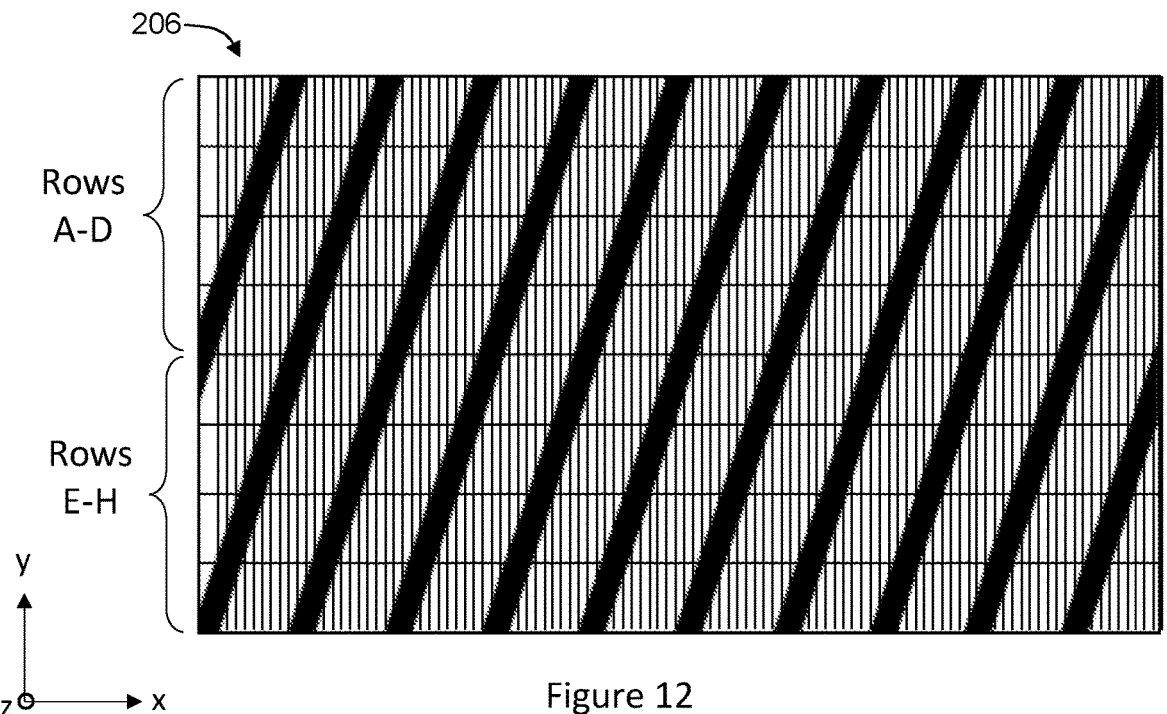
FIG. 12 is a schematic drawing of an image of scale features falling on a sensor of a readhead according to the present invention, wherein the scale and readhead are yawed relative to each other.
Figure 13:
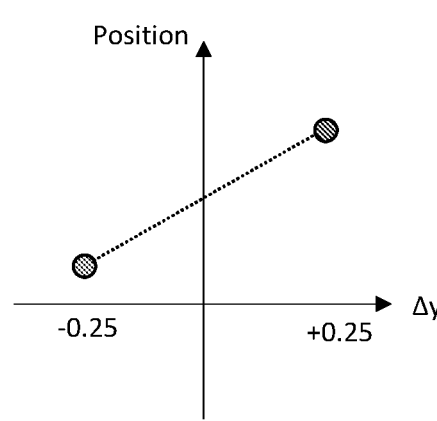
Figure 14:
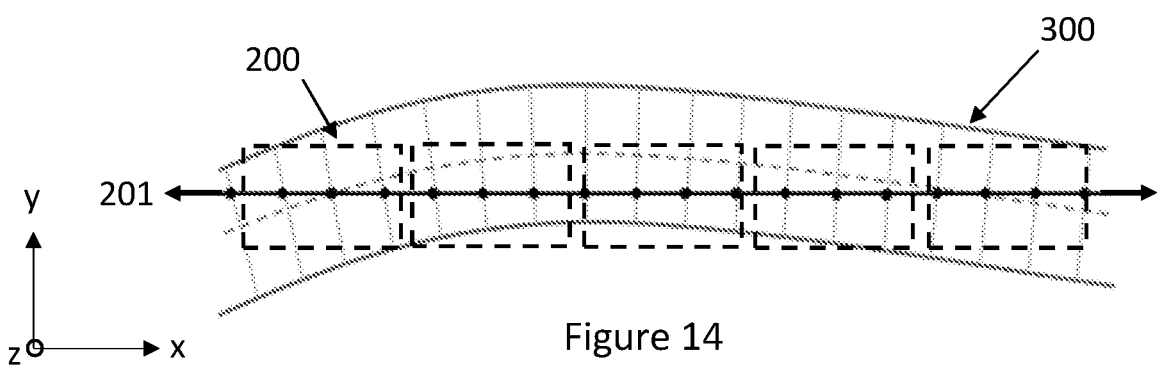
Figure 16:
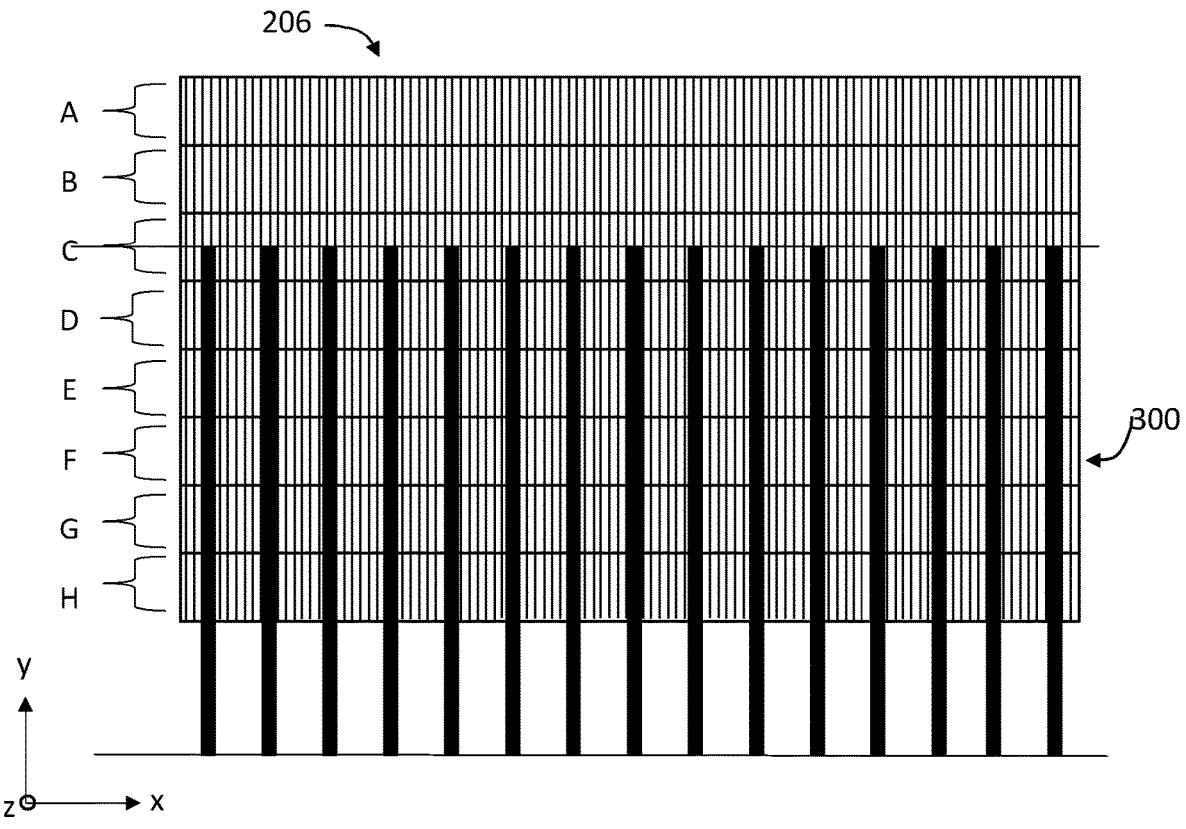
Figure 17:
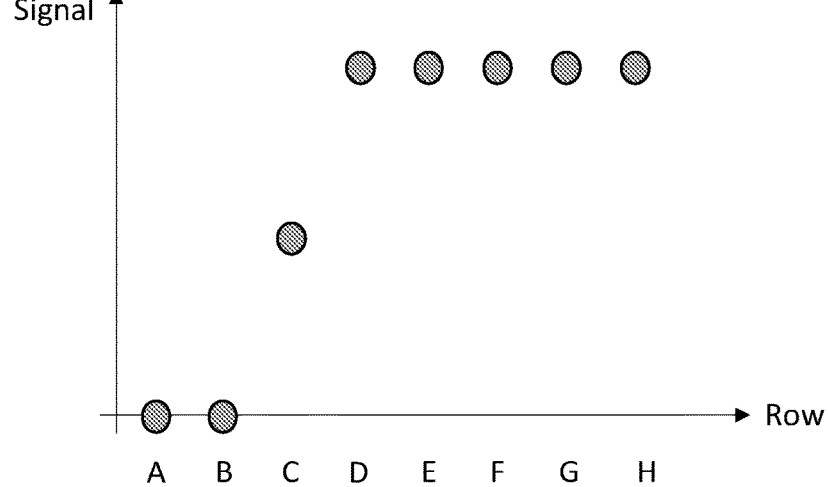

FIG. 13 a graph illustrating the determined position along the scale as determined by two images obtained by different proper subsets of rows of the columnar pixels of the sensor of FIG. 12;

FIG. 14 is a plan view of different positions of a readhead along the length of a linear scale which has been mounted in a curved configuration;

FIG. 15(a) schematically illustrates a rotary encoder comprising an edge-read ring scale and a readhead;

FIG. 15(b) schematically illustrates the yaw-effect the readhead of the rotary encoder of FIG. 15(a) will experience if the ring scale is mounted such that there is swash present on rotation;

FIG. 16 schematic drawing of an image of scale features falling only partially on a sensor of a readhead according to the present invention, due to lateral misalignment between the scale and readhead; and FIG. 17 is a graph illustrating the signal strength of obtained by the different rows of the sensor and image arrangement shown in FIG. 16.

Figures 1, 2, 3, 4:
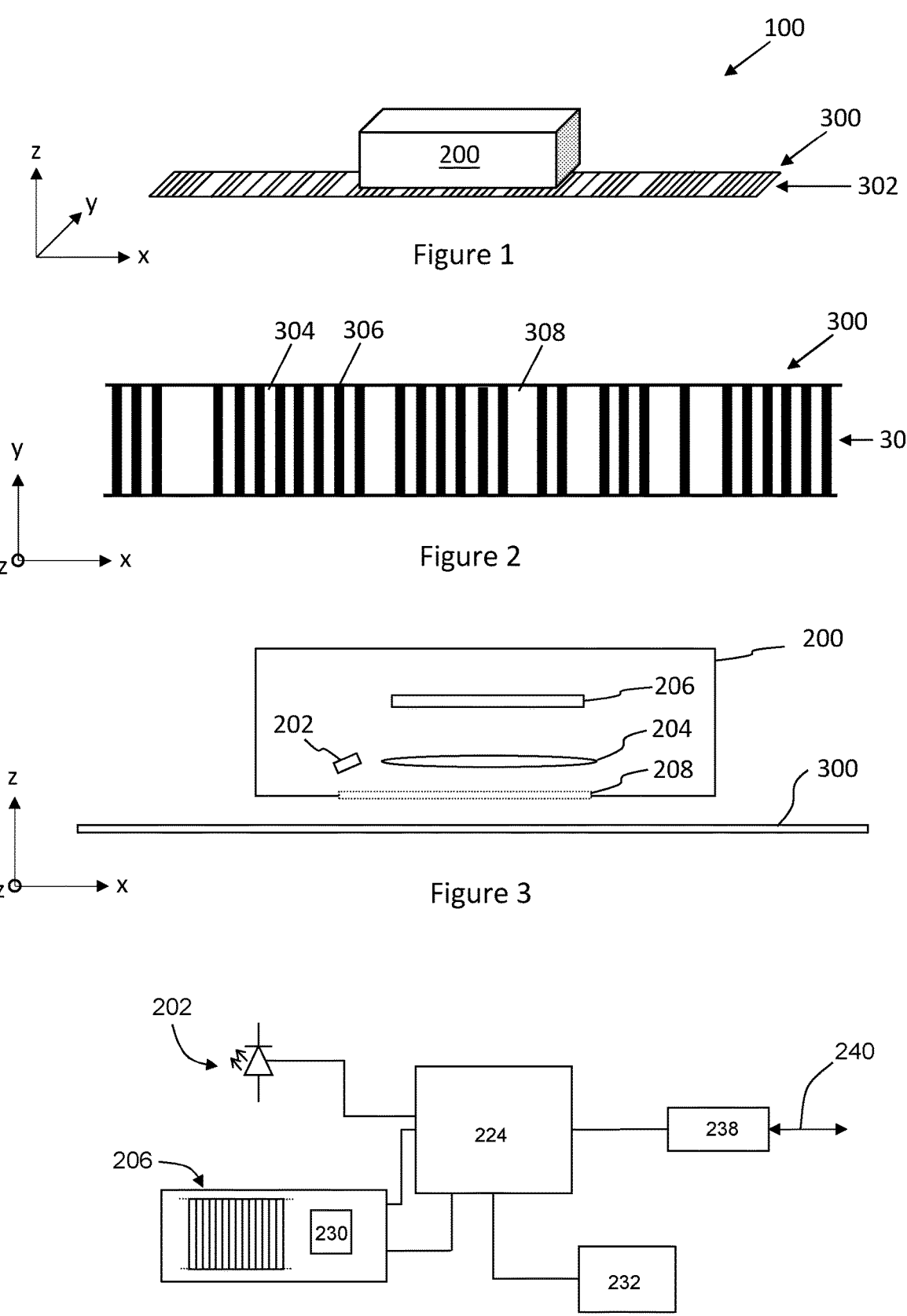
FIG. 1 shows an encoder apparatus comprising a scale and a readhead.
FIG. 2 is a plan view of the scale of FIG. 1.
FIG. 3 is a schematic drawing of the optical components of the readhead of FIG. 1.
FIG. 4 is a schematic drawing of the electronic components of the readhead of FIG. 1.

Referring to FIGS. 1 to 3, there is shown an embodiment of the invention, which in embodiment comprises an absolute encoder 100 comprising a readhead 200 and a scale 300. The readhead 200 and scale 300 are respectively provided/mounted on first and second parts of a machine (not shown) which are moveable relative to each other along the X axis. In the embodiment described, the scale 300 is a linear scale. However, it will be understood that the scale 300 could be other types of scale, such as a rotary scale. As will be understood, the readhead 200 is used to measure the relative position (and/or its derivatives such as velocity and/or acceleration) of itself and the scale 300 along the X dimension, and hence can be used to provide a measure of the relative position (and/or its derivatives such as velocity and/or acceleration) of the two movable parts of the machine along the X dimension.

The readhead 200 communicates with an external device, such as a controller (not shown), via a wired and/or wireless communication channel. The readhead 200 could be configured to report the signals from its sensor to the external device which then processes them to determine position information. Additionally or alternatively, the readhead 200 can itself process the signals from its detectors and send position information to the controller.

The signal(s) output by the readhead 200 can take many different forms. For example, as is known in the field of position measurement encoders, a readhead can output digital quadrature (A, B) signals, analogue quadrature (SIN, COS) signals, and/or serial data which represents position information.

In another embodiment, an intermediate unit, e.g. an interface unit, can be located between the readhead 200 and the above-mentioned external device (e.g. controller). The interface unit can facilitate communication between the readhead 200 and external device. For example, the interface unit could be configured to process readhead signals and provide position information to the external device (e.g. in the form of digital quadrature (A, B) signals, analogue quadrature (SIN, COS) signals, and/or serial data).

In the embodiment described, the scale 300 is an absolute scale and comprises a track 302 having a series of reflective 304 and non-reflective 306 lines which extend perpendicular to the measurement direction X. The reflective 304 and non-reflective 306 lines are generally arranged in an alternate manner at a predetermined period (i.e. defining a particular spatial frequency). However, select non-reflective lines 308 are missing from the track 302 so as to form discrete codewords thereby encoding absolute position data in the track 302. Further details of such an absolute scale and how absolute position information is encoded within the track is described in International Patent Application no. PCT/GB2002/001629 (publication no. WO 2002/084223), the content of which is incorporated in this specification by this reference. The scale 300 comprises a single track 302 only, but could comprise multiple tracks. For instance, a separate incremental or separate absolute track could be provided in addition to the track shown if desired.

As will be understood, absolute position data could be encoded in the track 302 by missing reflective lines 304, as well as, or instead of missing non-reflective lines 306. Furthermore, absolute position data could be embedded in the track 302 without the addition or removal of reflective 304 or non-reflective lines 306. For instance, the width of lines or the distance between them could be varied in order to embed the absolute position data in the scale 300. Further still, rather than providing discrete codewords, the absolute data could be embedded in the form of a pseudorandom bit sequence (as for example described in European Patent no. 0503716). In another embodiment, the scale 300 could comprise incremental scale, such that the encoder apparatus is an incremental encoder. As will be understood, one or more reference marks can be provided next to, or embedded within the incremental scale track.

As illustrated in FIG. 3 the readhead 200 comprises a light source 202 (which in this embodiment comprises a light emitting diode (LED)), a lens 204, a one-dimensional sensor 206 and a window 208. In the described embodiment, the sensor 206 comprises 512 columnar/elongate pixels whose length extend parallel to the length of the reflective 304 and non-reflective lines 306 on the scale (which is perpendicular to the measuring direction of the scale 300). Further details of the sensor 206 will be described in more depth in connection with FIGS. 5 and 6.

Light emitted from the light source 202 passes through the window 208 and falls on the scale 300. Light reflected by the reflective scale features 304 passes back through the window 208 and through the lens 204 which focuses the reflected light onto the sensor 206. In the embodiment described, the sensor 206 is located at the conjugate plane of the scale 200, and therefore an image of a part of the scale 300, in particular of a part of the track 302, is formed on the sensor 206. FIG. 3 is a schematic representation of the optical arrangement of a readhead configured to image the scale. Further details of suitable optical arrangements can be found, for example, in WO2010/116144 and WO2021/094456, the contents of which are incorporated in this specification by this reference Referring to FIG. 4, the readhead 200 also comprises a processor 224, an analogue-to-digital converter (ADC) 230, a memory device 232 in the form of Electrically Erasable Programmable Read-Only Memory (EEPROM) or Flash Memory, and an interface 238. As will be understood by a person of ordinary skill in the art, the readhead 200 can comprise other suitable electrical components, e.g. amplifiers, drivers, etc., which have been omitted from FIG. 4 for the sake of clarity.

The sensor 206 is connected to the processor 224 such that the processor 224 can receive a digitised image of the intensity of light falling across the sensor 206. As will be understood, an ADC 230 (which could be separate from, or integrated with, the sensor 206) can be used to digitise the sensor output. The sensor 206 is also directly connected to the processor 224 so that the sensor 206 can be instructed to take a snapshot of intensity falling across it on demand by the processor 224. The processor 224 is connected to the memory 232 so that it can store and retrieve data for use in its processing of the sensor's output to determine position information. The interface 238 is connected to the processor 224 so that the processor 224 can receive demands from and output results to external devices (not shown) via line 240. As will be understood, FIG. 4 is one schematic illustration of the configuration of the readhead, and it is not necessary for the components identified to be discrete components. For instance, all, or a combination of some, of the components shown in FIG. 4 could, for instance, be provided by one, or a number of ASICs.

Figure 5:
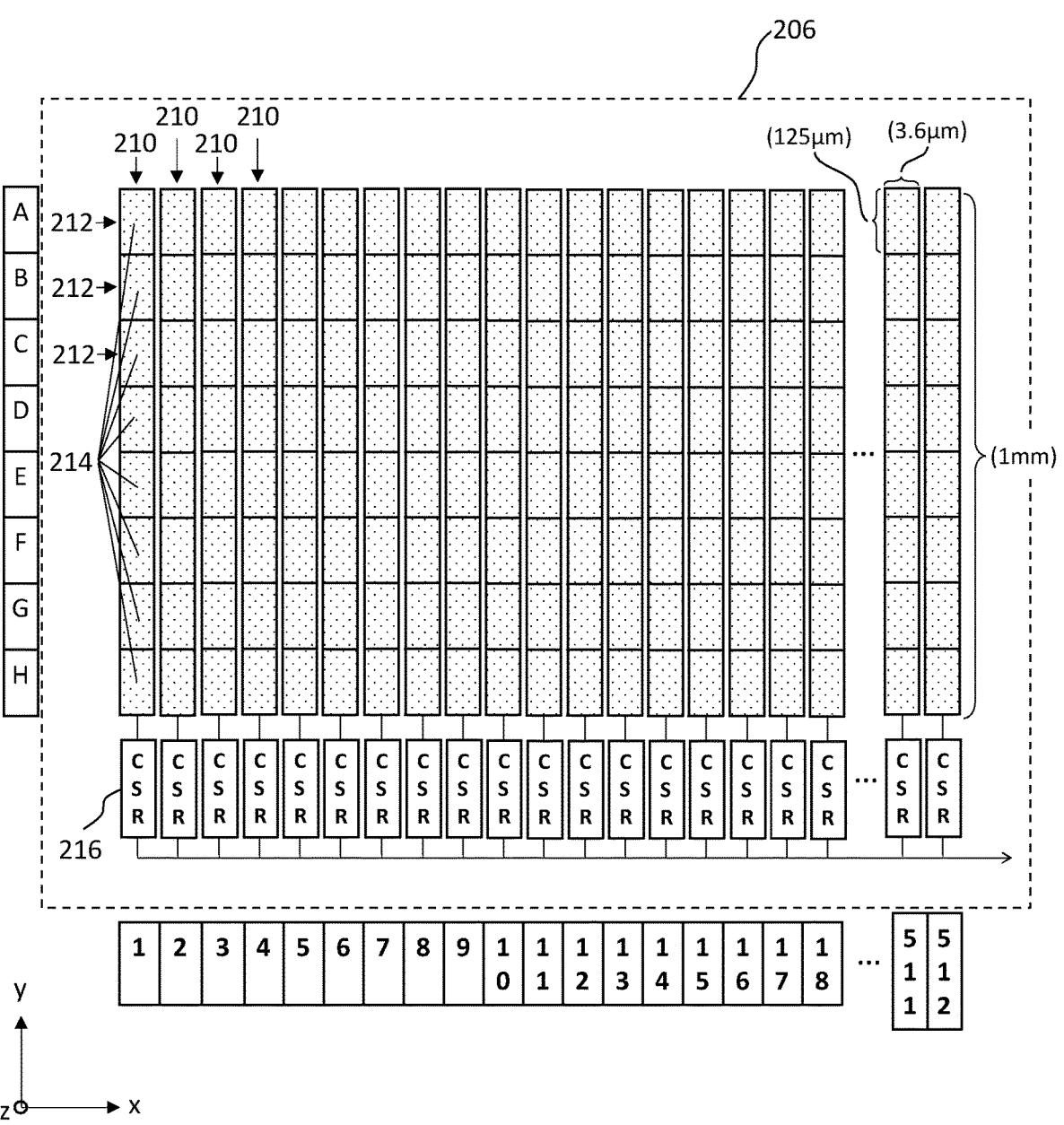
FIG. 5 is a schematic drawing of the sensor of the readhead according to the invention.

FIG. 5 schematically illustrates the configuration of the sensor 206 in accordance with one embodiment of the invention. As shown, the sensor 206 comprises 512 columnar pixels 210, labelled 1 to 512 in FIG. 5. Each columnar pixel is individually addressable. Rather than each columnar pixel 210 comprising a single elongate photodiode of 1 mm long and 3.6 μm wide, in accordance with the present invention, each columnar pixel is divided into eight rows 212, labelled A to H in FIG. 5, wherein an individual photodiode 214 is provided in each row of each columnar pixel. Accordingly, in the embodiment described, each columnar pixel 210 is made up of eight separate photodiodes 214, wherein each of the eight photodiodes in a columnar pixel is approximately 125 μm long (and 3.6 μm wide). Each columnar pixel 210 is configured such that each of its photodiodes 214 can contribute to the columnar pixel's output. In the embodiment described, each columnar pixel comprises a Charge Storage Region (CSR) 216 (which could comprise a Floating Diffusion (FD) node, for example) where the charge from each of the columnar pixels' photodiodes can accumulate. Accordingly, when a columnar pixel 210 is read, the value provided by a columnar pixel is the accumulated charge stored at the CSR.

Dividing a columnar/elongate pixel into a number of shorter photodiodes can facilitate a faster sensor readout compared to a sensor where each columnar pixel comprises only one long photodiode. This could be for a number of reasons. For instance, it takes longer to read off the charge for a longer photodiode compared to a shorter photodiode. Also, for example, dividing a columnar/elongate pixel into a number of shorter photodiodes can give greater design freedom thereby enabling the choice of designs which facilitate shorter readout times, such as each photodiode comprising its own integrated/dedicated transfer gates. Accordingly, a sensor configured in accordance with the invention can maintain the benefit of good photometry of elongate pixels and facilitate a reduction in readout time, especially when the charge from each photodiode in a columnar pixel can be read and stored at the CSR 216 simultaneously.

Figure 6:
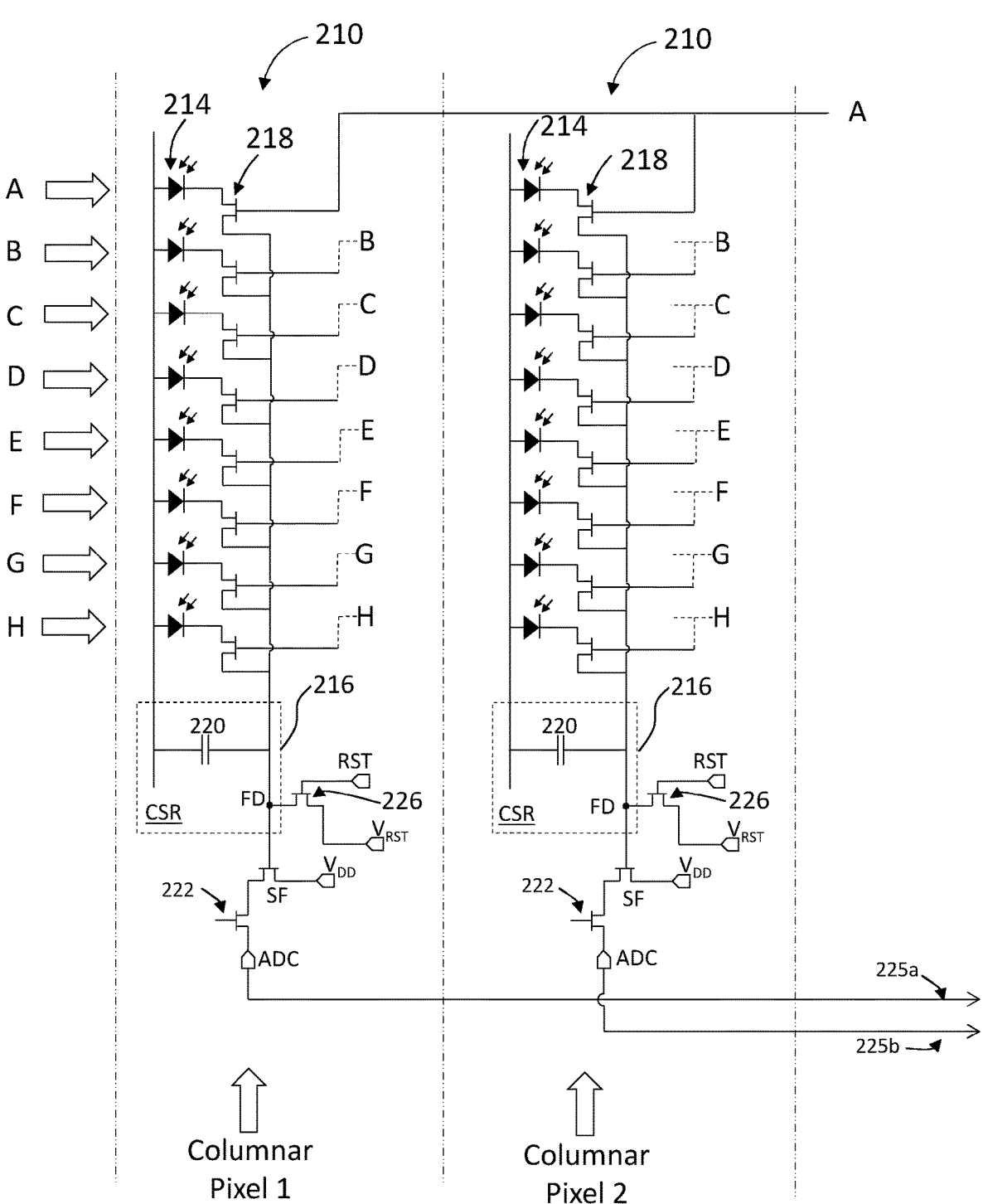
FIG. 6 is a detailed view of two of the columnar pixels of the sensor of FIG. 5.

FIG. 6 shows the configuration of a columnar pixel 210 of FIG. 5 in more detail. In particular, FIG. 6 shows columnar pixel numbers 1 and 2 of FIG. 5. As shown, each columnar pixel 210 comprises eight individual photodiodes 214, each of which are connected to a CSR 216 for the columnar pixel. In this particular embodiment, each row (A to H) of photodiodes 214 is individually activatable. As shown, each photodiode 214 in a columnar pixel 210 is connected to the columnar pixel's CSR 216 via a (transmission) switch/gate, in this embodiment a switch transistor 218. When the switch transistor 218 for any given photodiode 214 is closed, light hitting the photodiode 214 causes charge to be stored at the columnar pixel's CSR 216, in particular in this embodiment at a capacitor 220. In accordance with a particular embodiment of the invention, any combination of rows (A to H) can be turned on (by activating the line so as to close its switch transistors 218) such that the charge from the photodiodes 214 in those rows is caused to be stored at the at the columnar pixel's CSR 216, in particular, in this embodiment, at the columnar pixel's capacitor 220. As illustrated in FIG. 6, the switch transistors 218 of photodiodes 214 in the same row across all columnar pixels (in other words, all of the sensor's photodiodes in the same row, e.g. row A) are connected such that they are turned on or off collectively/"as one". FIG. 6 explicitly depicts that the switch transistors 218 of row A are connected together via a line, but for the sake of clarity of depiction, broken dotted lines are used to schematically illustrate that the switch transistors 218 in other rows are connected together, "as one" (i.e. the switch transistors 218 row B are connected together, "as one", the switch transistors 218 row C are connected together, "as one", and so on). As will be understood, it might not be practical to have a single line which connects all switch transistors in a row (e.g. due to electrical capacitance build up), and so it might be necessary to use a fan-out circuit to connect multiple switch transistors together. Nevertheless, all switch transistors 218 in any given row are configured to be activated or deactivated collectively/"as one".

Each columnar pixel 210 can be addressed and read via an address switch 222. Closing the address switch 222 causes the voltage stored at the CSR 216 to be output via a source follower (SF) amplifier and an ADC, to an external processor via an output line 225a, 225b. Each columnar pixel 210 can be addressed and read individually/separately in the same way. Once a columnar pixel 210 has been read, the charge/voltage stored at the columnar pixel's CSR 216 can be reset by a reset signal RST causing a reset switch 226 to close, thereby setting the capacitor 220 at a known, predetermined voltage VRST. Such a reset could be effected for all columnar pixels simultaneously. As will be understood, each columnar pixel could have its own output line as illustrated in FIG. 6, or some or all of the columnar pixels could share one or more output lines (e.g. and therefore their outputs are serially read out).

As described above, in the embodiment of FIG. 6, each row of photodiodes (A to H) is individually activatable so that which one or more of the individual photodiodes 214 in the columnar pixels 210 contribute to the accumulated charge stored at each columnar pixel's CSR 216 can be selectively chosen and changed on a row-by-row basis. In other words, the sensor is configured such that all photodiodes in the same row are collectively activatable, on a row-by-row basis. This need not necessarily be the case. For example, it might be that the sensor is configured such that all photodiodes in a columnar pixel 210 are permanently connected to the columnar pixel's CSR 216 such that it is not possible to selectively turn on/off photodiodes. However, providing selectively activatable rows of photodiodes, as per the embodiment of FIG. 6 can provide a number of benefits, including, for example, determining information about the scale used with the readhead (e.g. such as its radius), improving setup and/or manufacture of the readhead, improving position measurement and/or encoder performance, more details examples of which will be described in more detail immediately below.

Being able to determine information about the scale used with the readhead can be particularly useful when the scale is a rotary scale, especially when the readhead can be used with scales of different diameters. For example, with rotary encoders, it is often necessary/desirable to convert the position information determined by the readhead to angle information. In the case of an absolute encoder, this such conversion is often done by the readhead, or for example by an interface unit which sits between the readhead and an external processing device/apparatus (e.g. a computer/controller device/apparatus), although it is possible for the external processing unit to do such a conversion (and for instance, in an incremental system it is more typical for the external processing device/apparatus to do such conversion). In any case, to perform such conversion, it is necessary to know some information about the scale the readhead is being used with, such as the size of the disc (e.g. its radius/diameter) and/or the nominal line count of the scale track, or some information related thereto. As will be understood, in the case of an absolute encoder, the nominal line count may not be the same as the actual line count, for instance, if lines are removed from the scale track in order to encode absolute data in the scale. Accordingly, in such a case, the line count will be the number of lines that would be present in the scale track if the missing lines were not omitted.

Figures 7, 8:
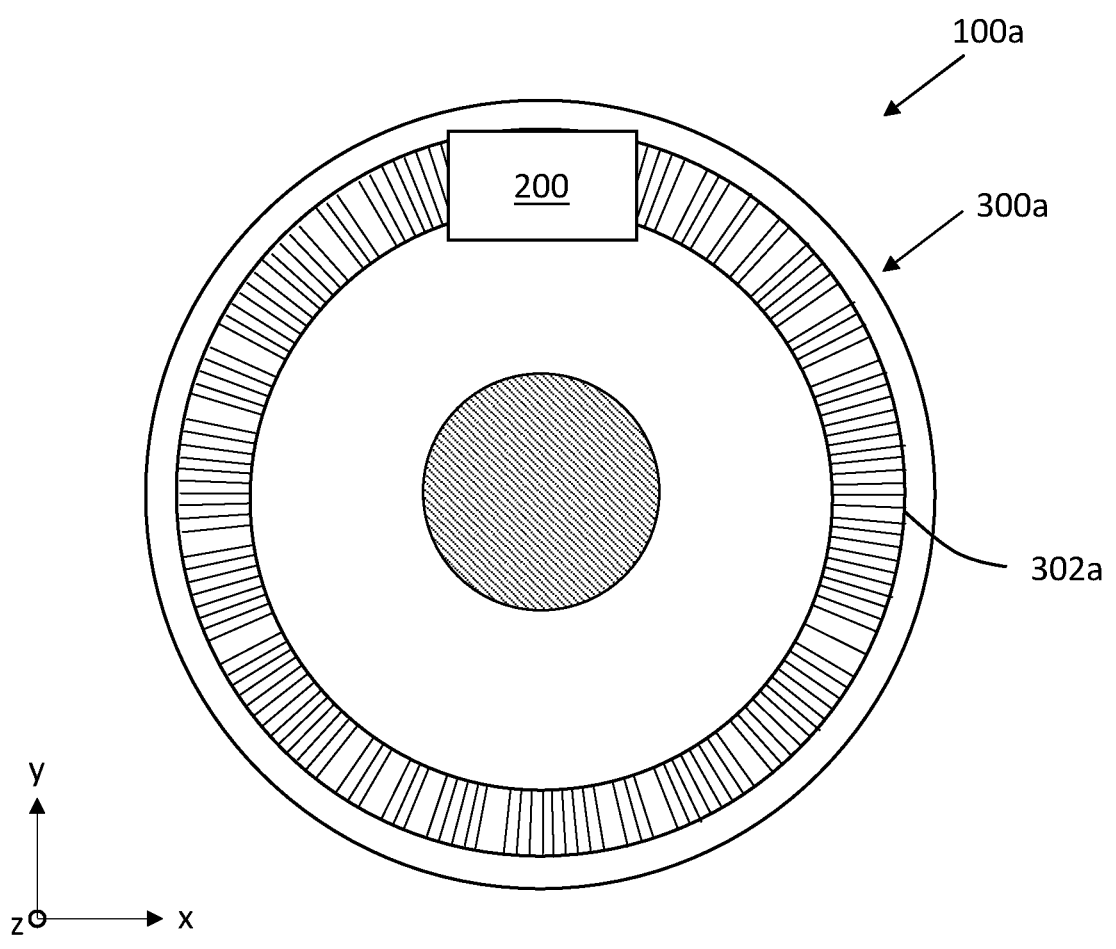
FIG. 7 is a plan view of a rotary disc encoder apparatus comprising a face-read disc scale and a readhead.
FIG. 8 is a schematic drawing of an image of two adjacent scale features of the scale of FIG. 7.

With the present invention, it is possible for the encoder apparatus (e.g. the readhead) to automatically determine such information from the scale track features itself. For instance, a face-read rotary scale typically has lines which extend along the radial direction. FIG. 7 is a plan view of such a rotary encoder apparatus 100a comprising a readhead 200 and rotary scale disc 300a which has a scale track 302a on one of its faces. In the embodiment shown, the scale track 302a comprises a series of reflective and non-reflective radially extending lines. The reflective and non-reflective lines are generally arranged in an alternate manner at a predetermined period (i.e. defining a particular spatial frequency). However, select non-reflective lines are missing from the track 302a so as to form discrete codewords thereby encoding absolute position data in the track 302a.

For a given line width, the number of lines in the scale track 302a will be dependent on the radius of the scale disc 300a. Also, due to the radially extending nature of the lines in the scale track 302a, the lines in an image of the scale track will spread further apart from each other along the radial direction. The smaller the radius of the scale disc, the larger this spreading will be. This spreading can be quantified by calculating the image period/spatial frequency at various points along the radial direction, e.g. by taking multiple images with different rows of the sensor 206 active. For example, FIG. 8 schematically depicts an image of two adjacent non-reflective lines in the scale track 302a, where the centre of the image is at reading radius R on the disc scale. θ equals the angular spacing between each line with the distance between them being Δx. As the radial direction of the reading position varies from its initial R reading position, then so does Δx. This is related by the equation:

$$\Delta x(R) = 2R\tan\left(\frac{\theta}{2}\right) \tag{1}$$

Encoders usually don't specify an angle between lines but instead specify a nominal number of lines around the full circumference of the circle (in other words the nominal line count "L"). Therefore:

$$\theta = \frac{2\pi}{L} \tag{2}$$

Δx can be calculated by the encoder by performing a Fourier transform of the image and determining the period of the dominant carrier spatial frequency. From this the Δx is known.

Figure 9:
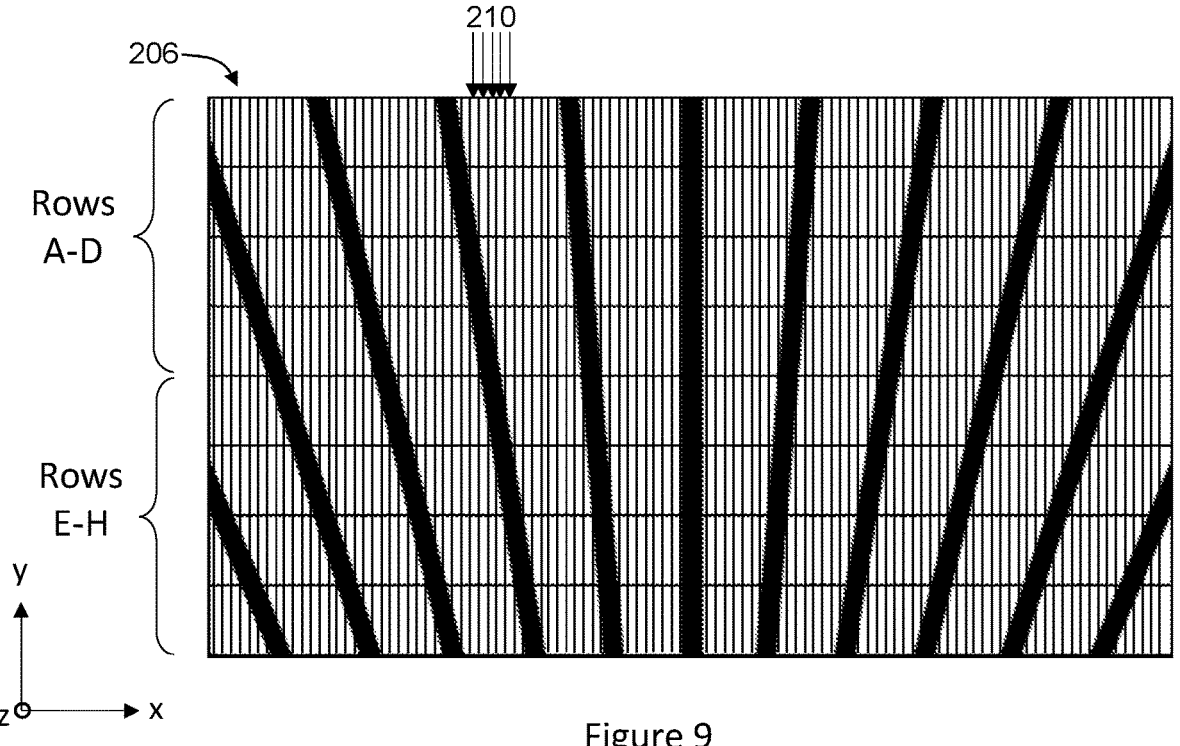
FIG. 9 is a schematic drawing of an image of a series of scale features of a face-read disc scale falling on a sensor of a readhead according to the present invention.

With the sensor of the present invention, it is possible to vary where along the radial direction the readhead reads the scale, by enabling and disabling certain rows of the sensor. For this example, and with reference to FIG. 9 (in which the radial splaying of the scale features are exaggerated for ease of illustration), the rows in the top half (rows A-D) could form a first proper subset of rows which take a first image of the scale track, and the rows in the bottom half (rows E-H) could form a second proper subset of rows which take a second image of the scale track.

Figure 10:
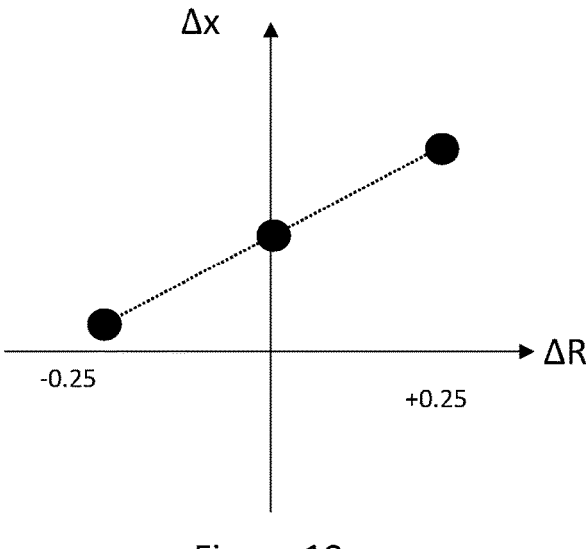
FIG. 10 is a graph illustrating the distance between adjacent scale features as determined by two images obtained by different proper subsets of rows of the columnar pixels of the sensor of FIG. 9.

The centres of the two images are spaced by four rows of photodiodes which in the example sensor shown in FIG. 5 is 4×0.125 mm=0.5 mm. Plotting the calculated Δx against these dimensions provides the graph shown in FIG. 10. The gradient of the best fit line is equivalent to:

$$2\tan\left(\frac{\pi}{L}\right) \tag{3}$$

Therefore this gradient can be used to determine the (e.g. nominal) line count (L) and detect what scale disc is present. This can be beneficial because it means that generic disc readheads can be manufactured, stocked and shipped to customers that perform this process at installation/start-up to determine the nominal line count it is reading and program itself accordingly. Such an approach is much more convenient and fail-safe compared to programming readheads at manufacture/shipping for specific discs, and/or requiring the customer/installer to manually program the readhead at installation. This avoids the need to configure encoder apparatus (e.g. readheads) at the manufacture site to work with specific sized discs, and therefore avoids the need to stock readheads for use with specific sized discs.

Figure 11:
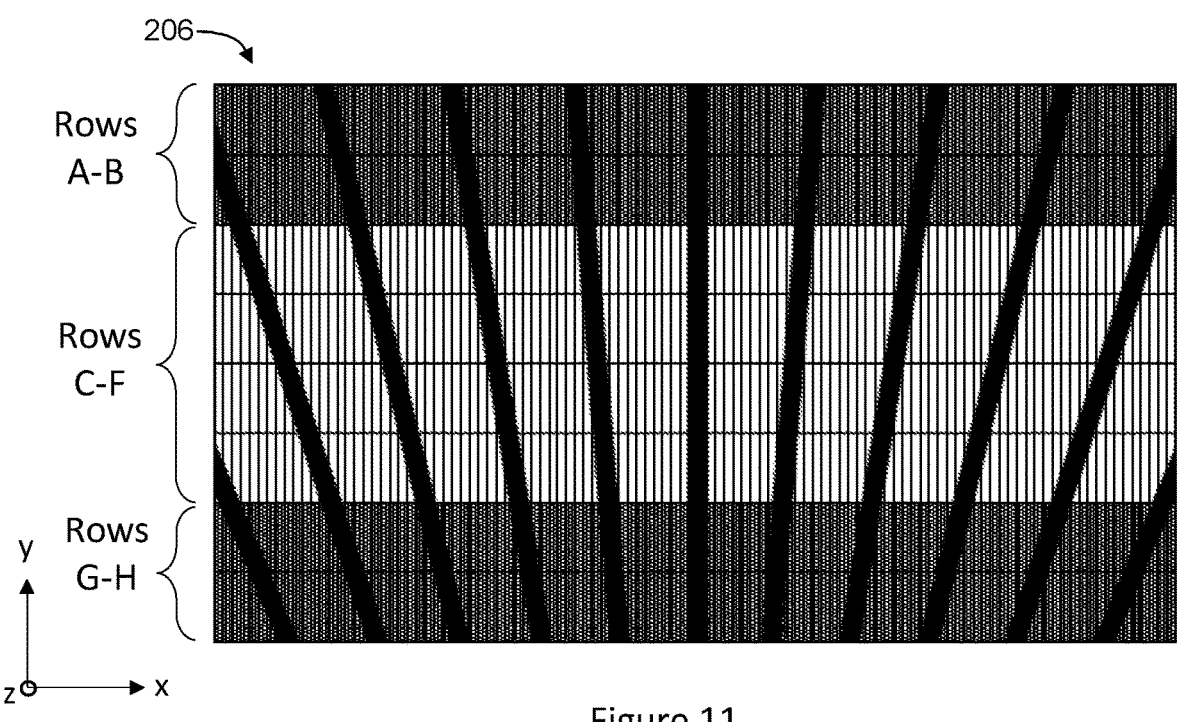
FIG. 11 shows the sensor and image arrangement of FIG. 9, wherein rows A, B, G and H are highlighted to illustrate that they can be disabled.

Another benefit of the invention when used with face-read rotary scale discs, is described as follows. The smaller the diameter of a disc, the larger the amount of radial spreading of the lines. To increase the reliability and accuracy of the position measurement, it is desirable to have a large sensing area (e.g. optical footprint) on the scale. This is the amount of scale lines visible on the image taken. However, for large amounts of radial spreading, the image will become blurred at the edges, due to imaged lines falling on multiple adjacent columnar pixels 210. Whilst one solution could be to manufacture and stock readheads with different sized sensors so that readheads with smaller sensors can be used on smaller diameter face-read scale discs, it is possible with the present invention to disable certain rows in order to shorten the columnar pixel length. For instance, with reference to FIG. 11, disabling rows A, B, G and H, such that only the photodiodes in the proper subset of rows C to F are used to sense the scale, shortens the effective/sensing length of the columnar pixels 210, which in this example would thereby improve the visibility of the sensed image.

Another benefit of a readhead which incorporates a sensor according to the present invention, and which is beneficial to both linear and rotary scales/encoders, will now be described with reference to FIGS. 12 to 15. FIG. 12 schematically shows an image of the scale track of FIGS. 1 and 2 falling on the sensor 206. As shown, the scale track lines 304/306 are misaligned with the columnar pixels 210, which in this case is due to the readhead 200 being "yawed" relative to the scale 300; in other words the misalignment is due to inadvertent rotation about the z-axis. The angular misalignment can be measured by measuring the readhead's position from images taken by different rows 212 of the sensor 206. For example, a first image can be taken by a first proper subset of the rows, e.g. the top four rows A-D and a second image can be taken by a second proper subset of the rows, e.g. the bottom four rows E-H. Plotting the positions determined by each of the first and second images against the geometric centre of the sensing sections that are active of each of the images (e.g. +0.25 mm and −0.25 mm) gives the graph illustrated in FIG. 13. The gradient of the graph is related to the yaw by the equation:

$$\text{yaw angle} = a\text{tan(gradient)} \qquad (4)$$

The yaw angle, or a parameter or signal related thereto, could be used, for example, during manufacture and/or installation/setup of the encoder apparatus. For instance, during manufacture the yaw angle (or a parameter or signal related thereto) could be output and used to determine whether the sensor is adequately aligned within the readhead. During installation/setup, the yaw angle (or a parameter or signal related thereto) could be output and used to determine if the readhead is correctly aligned with respect to the scale. The yaw angle, or a parameter or signal related thereto, could also be used to determine how to correctly align the sensor/readhead. Such correction could be performed automatically or manually. Accordingly, as with other embodiments of the invention, the yaw angle, or a parameter or signal related thereto, could be used as part of a feedback loop to aid set up.

Also, as with other embodiments of the invention, the yaw angle, or a parameter or signal related thereto, could be used to correct measurement signals/compensate for misalignment of the scale and/or readhead. For instance, referring to FIG. 14, if a linear scale 300 is not mounted in a straight line, then the scale is curved. This can be measurable by measuring the yaw angle of the readhead 200 relative to the scale 300, as the readhead travels along the length of the linear scale. Not only can such curving of the scale 300 be measured, but it can also be compensated for. For instance, by assuming the readhead 200 has moved in a straight line as indicated by the straight line 201 in FIG. 14, and by measuring the relative yaw of the scale and readhead at a plurality of points along the length of the scale (e.g. at each of the points indicated by the dots on arrow 201—five of such points being schematically illustrated by the dashed-outlined readhead 200) it is possible to quantify how much longer the scale is (measured along its centre-line) compared to the straight-line distance the readhead has actually travelled, and compensate for the resultant error.

Figure 15:
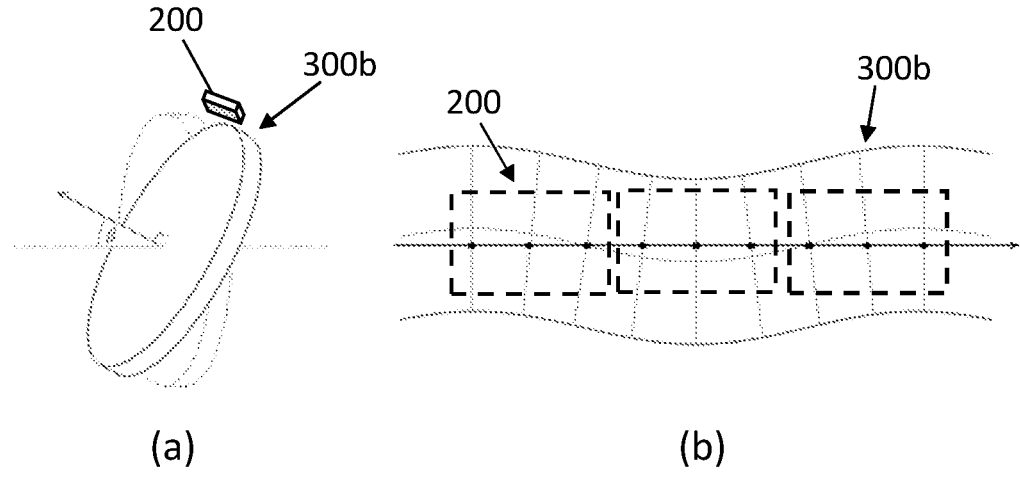

With reference to FIGS. 15(*a*) and (*b*), in a similar way, any swash on an edge-read ring scale 300*b* (i.e. a rotary scale where the scale features are provided on the outwardly facing circumferential edge/side of a ring or disc shaped body) can be measured because, as schematically depicted by FIG. 15(*b*), it presents as a yaw error in the image read by the readhead. Accordingly, determining yaw measurements as the ring scale 300*b* rotates relative to the readhead 200 can be used to compensate for any measurement error caused by swash of the ring scale. As will be understood, swash can present as a cyclical, reciprocating axial motion of the edge of the ring scale as it rotates about the axis, which can be caused, for example, by any non-planarity of the ring scale and/or due to its non-perpendicular mounting with respect to the axis of rotation.

Another benefit of a readhead which incorporates a sensor according to the present invention, will now be described with reference to FIGS. 16 and 17. Scales lines are written to a finite length, and ideally an image of the scale lines should have the scale lines extending across the entire extent/width of the sensor (i.e. across all rows). As schematically depicted in FIG. 16, if the readhead is laterally offset relative to the scale too much (in a direction perpendicular to the measuring direction), then the scale lines will only extend part way across the extent/width of the sensor. A readhead having a sensor according to the present invention can detect this by taking images of the scale with different rows to determine where in the sensor width the lines are no longer imaged and therefore how much the readhead is offset relative to the scale in a direction perpendicular to the measuring direction. For example, separate images of the scale could be obtained by each row A-H and the signal strength of each image (e.g. the amplitude of the dominant spatial frequency in a Fourier Transform of each image). If this were done for the example of FIG. 16 and the results plotted against the y-position of the centre of the image for each row, a graph similar to that shown in FIG. 17 would be obtained. FIG. 17 shows that the sensor 206 has no signal in rows A and B, about half the normal signal in row C, and full signal is rows D to H, from which it can be concluded that the scale lines finish halfway across the width of the photodiodes in row C of the sensor. As per the other embodiments, this information and/or a parameter related thereto, could be output and/or used during manufacture, setup/installation and/or operation of the encoder. For example, such information/output could be used to facilitate adjustment of the sensor, readhead and/or scale to improve alignment.

Furthermore, a readhead incorporating a sensor according to the invention can be configured such that some rows of photodiodes are shut-off/not used during operation. For instance, it is possible to select the rows in the image capture process which will provide the optimum signal. For example, with reference to FIG. 16, if it is not possible or desirable to change the relative position of the readhead and scale in the dimension perpendicular to the measuring direction, then the visibility of the image can be improved by deactivating rows A to C such that only rows D to H contribute to the image obtained by the sensor 206 during the normal operation of the readhead 200/encoder apparatus.

Another benefit of a readhead which incorporates a sensor according to the present invention is that (either in calibration mode or during operation), the readhead could learn the location of areas of the scale which are damaged or dirty by comparing images from individual rows. Then, subsequently, the readhead could selectively turn off appropriate rows in the vicinity of areas which have been identified as damaged or dirty to minimise the impact.

The invention claimed is:

1. A position measurement encoder comprising:

a scale; and a readhead comprising a sensor for sensing the scale, the sensor comprising a pixel area consisting of a one-dimensional array of columnar pixels that are divided into a plurality of rows and are arranged so that no other pixels are located between adjacent ones of the columnar pixels, wherein each of the columnar pixels has at least one individual sensing section located in each of the plurality of rows and arranged to contribute to an output of the columnar pixel, and wherein the sensor is configured so that each row of the plurality of rows can be individually activated or deactivated so that which of the individual sensing sections that contribute to the outputs of the columnar pixels can be selectively chosen and changed on a row-by-row basis, whereby the sensor can selectively change between:

(i) all of the individual sensing sections of the array of columnar pixels contributing to the outputs of the columnar pixels; and (ii) fewer than all of the individual sensing sections of the array of columnar pixels contributing to the outputs of the columnar pixels.

2. The position measurement encoder as claimed in claim 1, wherein the individual sensing sections in a columnar pixel of the array of columnar pixels can be read simultaneously.

3. The position measurement encoder as claimed in claim 1, wherein the output of each columnar pixel of the array of columnar pixels is stored in a shared signal storage region, the output comprising signal from multiple ones of the individual sensing sections in the columnar pixel.

4. The position measurement encoder as claimed in claim 1, wherein a ratio of light sensitive length of each columnar pixel of the array of columnar pixels to a light sensitive width of the columnar pixel is at least 10:1.

5. The position measurement encoder as claimed in claim 1, wherein the sensor is divided into at least four of the plurality of rows.

6. The position measurement encoder as claimed in claim 1, wherein the array of columnar pixels comprises at least 256 columnar pixels.

7. The position measurement encoder as claimed in claim 1, wherein each of the individual sensing sections comprises a photodetector.

8. The position measurement encoder as claimed in claim 7, wherein all the photodetectors in a columnar pixel of the array of columnar pixels are configured to detect the same wavelength range.

9. The position measurement encoder as claimed in claim 1, configured such that the sensor is arranged at a conjugate plane of the scale.

10. The position measurement encoder as claimed in claim 1, wherein the scale is a one-dimensional scale.

11. The position measurement encoder as claimed in claim 1, wherein each columnar pixel of the array of columnar pixels has only a single individual sensing section in each row of the plurality of rows which is arranged to contribute to the output of the columnar pixel.

12. A method of operating the position measurement encoder according to claim 1, comprising:

obtaining a reading of the scale by, for each of a plurality of the array of columnar pixels, reading the output generated by the individual sensing sections in a first proper subset of the rows.

13. The method as claimed in claim 12, further comprising:

obtaining another reading of the scale by, for each of the plurality of the array of columnar pixels, reading the output generated by the individual sensing sections in a second proper subset of the rows, different from the first proper subset.

14. The method as claimed in claim 12, wherein the rows included in the first proper subset are selected based on a parameter determined from at least one previous reading of the scale.

15. The method as claimed in claim 12, comprising operating the readhead to:

cause the sensor to repeatedly obtain readings of the scale;

concurrently monitor at least some of the readings; and based thereon, automatically adapt which subset of the plurality of rows are used to contribute to the outputs of the columnar pixels for one or more subsequent readings of the scale.

16. A position measurement encoder comprising:

a scale; and a readhead comprising a sensor for sensing the scale, the sensor comprising a one-dimensional array of columnar pixels divided into a plurality of rows, wherein:

each columnar pixel of the array of columnar pixels has (i) at least one individual sensing section located in each of the plurality of rows and arranged to contribute to an output of the columnar pixel and (ii) a charge storage region for accumulating charge from multiple of the individual sensing sections in the columnar pixel;

the sensor is configured so that each row of the plurality of rows can be individually activated or deactivated so that which of the individual sensing sections that contribute to the accumulated charge stored at the charge storage regions of the columnar pixels can be selectively chosen and changed on a row-by-row basis, whereby the sensor can selectively change between:

(i) all of the individual sensing sections of the array of columnar pixels contributing to the accumulated charge stored at the charge storage regions of the columnar pixels; and (ii) fewer than all of the individual sensing sections of the array of columnar pixels contributing to the accumulated charge stored at the charge storage regions of the columnar pixels; and the output of each columnar pixel comprises the accumulated charge stored at the accumulated charge storage region of the columnar pixel.

17. The position measurement encoder as claimed in claim 16, wherein the charge of the individual sensing sections in a columnar pixel of the array of columnar pixels can be transferred to the accumulated charge storage region of the columnar pixel simultaneously.

18. The position measurement encoder as claimed in claim 16, wherein a ratio of light sensitive length of each columnar pixel of the array of columnar pixels to a light sensitive width of the columnar pixel is at least 10:1.

19. The position measurement encoder as claimed in claim 16, wherein the sensor is divided into at least four of the plurality of rows.

20. The position measurement encoder as claimed in claim 16, wherein the array of columnar pixels comprises at least 256 columnar pixels.

21. The position measurement encoder as claimed in claim 16, wherein each of the individual sensing sections comprises a photodetector.

22. The position measurement encoder as claimed in claim 21, wherein all the photodetectors in a columnar pixel of the array of columnar pixels are configured to detect the same wavelength range.

23. The position measurement encoder as claimed in claim 16, configured such that the sensor is arranged at a conjugate plane of the scale.

24. The position measurement encoder as claimed in claim 16, wherein the scale is a one-dimensional scale.

25. The position measurement encoder as claimed in claim 16, wherein each columnar pixel of the array of columnar pixels has only a single individual sensing section in each row of the plurality of rows which is arranged to contribute to the output of the columnar pixel.

26. A method of operating the position measurement encoder according to claim 16, comprising:

obtaining a reading of the scale by, for each of a plurality of the array of columnar pixels, reading the output generated by the individual sensing sections in a first proper subset of the rows.

27. The method as claimed in claim 26, further comprising:

obtaining another reading of the scale by, for each of the plurality of the array of columnar pixels, reading the output generated by the individual sensing sections in a second proper subset of the rows, different from the first proper subset.

28. The method as claimed in claim 26, wherein the rows included in the first proper subset are selected based on a parameter determined from at least one previous reading of the scale.

29. The method as claimed in claim 26, comprising operating the readhead to:

cause the sensor to repeatedly obtain readings of the scale;

concurrently monitor at least some of the readings; and based thereon, automatically adapt which subset of the plurality of rows are used to contribute to the outputs of the columnar pixels for one or more subsequent readings of the scale.

* * * * *